(12) United States Patent
Nakamura (10) Patent No.: US 9,880,558 B2
(45) Date of Patent: Jan. 30, 2018

(54) TRAVEL CONTROL DEVICE

(71) Applicant: TOYOTA JIDOSHA KABUSHIKI KAISHA, Toyota-shi, Aichi-ken (JP)

(72) Inventor: Hiroshi Nakamura, Isehara (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/055,968

(22) Filed: Feb. 29, 2016

(65) Prior Publication Data

US 2016/0259338 A1 Sep. 8, 2016

(30) Foreign Application Priority Data

Mar. 2, 2015 (JP) .................................. 2015-040358

(51) Int. Cl.
| | |
|---|---|
| G05D 1/02 | (2006.01) |
| B60W 30/12 | (2006.01) |
| B60W 30/095 | (2012.01) |
| B60W 30/18 | (2012.01) |

(52) U.S. Cl.
CPC ......... *G05D 1/0212* (2013.01); *B60W 30/095* (2013.01); *B60W 30/12* (2013.01); *B60W 30/18145* (2013.01); *B60W 2420/42* (2013.01); *B60W 2520/10* (2013.01); *B60W 2520/105* (2013.01); *B60W 2520/125* (2013.01); *B60W 2520/14* (2013.01); *B60W 2550/14* (2013.01); *B60W 2550/146* (2013.01); *B60W 2720/24* (2013.01)

(58) Field of Classification Search
CPC G05D 1/0212; B60W 30/0956; B60W 30/12; B60W 2250/14; B60W 2720/24
See application file for complete search history.

(56) References Cited

U.S. PATENT DOCUMENTS

| | | | | |
|---|---|---|---|---|
| 5,229,941 A | * | 7/1993 | Hattori | G05D 1/0217 180/167 |
| 6,292,725 B1 | * | 9/2001 | Kageyama | G05D 1/027 180/169 |
| 2007/0233386 A1 | * | 10/2007 | Saito | B62D 15/025 701/300 |
| 2011/0087433 A1 | * | 4/2011 | Yester | G08G 1/163 701/301 |
| 2013/0110343 A1 | | 5/2013 | Ichikawa et al. | |
| 2014/0074388 A1 | | 3/2014 | Bretzigheimer et al. | |
| 2014/0200768 A1 | * | 7/2014 | Tsuruta | B62D 15/025 701/41 |

(Continued)

FOREIGN PATENT DOCUMENTS

| | | |
|---|---|---|
| CN | 103842228 A | 6/2014 |
| JP | 2000-033860 A | 2/2000 |

(Continued)

*Primary Examiner* — Anne M Antonucci
(74) *Attorney, Agent, or Firm* — Sughrue Mion, PLLC (57) ABSTRACT

A travel control device which allows a vehicle to travel along a lane of a travel path recognizes lane markers on the right and left of a lane, sets a travel area of the vehicle between the lane markers, selects a travel path candidate having high straightness among a plurality of travel path candidates with priority and determines the selected travel path candidate as a target travel path, and performs travel control according to the target travel path.

5 Claims, 7 Drawing Sheets

(56) References Cited

U.S. PATENT DOCUMENTS

2014/0200801 A1* 7/2014 Tsuruta ................ B60W 30/00
                                                        701/400
2014/0244142 A1* 8/2014 Matsubara .......... B60W 10/184
                                                        701/116
2015/0094915 A1* 4/2015 Oyama ................ B62D 15/025
                                                         701/42

FOREIGN PATENT DOCUMENTS

| JP | 3912323 B2 | 2/2007 |
| JP | 2011-162132 A | 8/2011 |
| JP | 2012-58984 A | 3/2012 |
| JP | 5382218 A | 10/2013 |
| WO | 2011/158347 A1 | 12/2011 |
| WO | 2013/051083 A1 | 4/2013 |

* cited by examiner

TRAVEL CONTROL DEVICE

INCORPORATION BY REFERENCE

The disclosure of Japanese Patent Application No. 2015-040358 filed on Mar. 2, 2015 including the specification, drawings and abstract is incorporated herein by reference in its entirety.

BACKGROUND OF THE INVENTION

1. Field of the Invention

The present invention relates to a travel control device for a vehicle.

2. Description of Related Art

In regard to travel control of a vehicle, for example, as described in Japanese Patent Application Publication No. 2000-33860, a device which images the front of the vehicle with an in-vehicle camera, detects right and left white lines of a lane, calculates a lateral deviation of the vehicle with respect to the center position between the right and left white lines, and performs braking control of the vehicle according to the lateral deviation is known.

In the device of this type, vehicle travel control is performed such that the vehicle travels based on the center position of the lane, that is, the center position between lane markers, such as right and left white lines. In this case, if the reference line at the center of the lane is distorted due to the detection accuracy of the white lines or the road shape, a target path of travel of the vehicle is distorted. If travel control is performed according to the target path, an occupant of the vehicle is likely to feel a sense of discomfort.

SUMMARY OF THE INVENTION

Accordingly, the invention provides a travel control device which can perform vehicle travel control while suppressing a sense of discomfort to an occupant of a vehicle.

A travel control device according to an aspect of the invention which allows a vehicle to travel along a lane of a travel path includes a detection unit which detects lane markers provided on the right and left of the lane; a travel area setting unit which sets a travel area of the vehicle between the lane markers in front of the vehicle; a path generation unit which generates a target travel path of the vehicle within the travel area set; and a travel control unit which allows the vehicle to travel along the target travel path. The path generation unit selects a travel path candidate having high straightness among a plurality of travel path candidates with priority and determines the selected travel path candidate as the target travel path.

According to the above-described aspect, the travel area of the vehicle is set between the lane markers of the lane, and the target travel path of the vehicle is generated within the travel area. For this reason, even if an error occurs in the detection of the lane markers, the influence on the target travel path is suppressed. When generating the target travel path of the vehicle within the travel area, the travel path candidate having high straightness is selected with priority and determined as the target travel path. For this reason, the target travel path easily becomes a straight travel path, and an occupant of the vehicle is suppressed from feeling unsteadiness for vehicle travel.

In the travel control device, when the vehicle is turning, the path generation unit may generate a returning path as a travel path candidate with priority over a steering maintaining path and an additional turning path, and when the generated travel path candidate is generated within the travel area, the travel path candidate may be determined as the target travel path. In this case, when the vehicle is turning, the returning path is generated as the travel path candidate with priority, and when the generated travel path candidate is generated within the travel area, the travel path candidate is determined as the target travel path. For this reason, the target travel path easily becomes a path close to straight travel, and an occupant of the vehicle is suppressed from feeling unsteadiness for vehicle travel.

In the travel control device, the travel area setting unit may set a lateral width of the travel area to be narrower with increasing distance from the vehicle while taking a center position of the travel area as a center position of the lane. In this case, the lateral width of the travel area is set to be narrower with increasing distance from the vehicle while taking the center position of the travel area as the center position of the lane, whereby the target travel path is generated within the travel area to make the target travel path be a path toward the center of the lane.

In the travel control device, the path generation unit may generate a travel path candidate having high straightness with priority, and when the generated travel path candidate is generated within the travel area, may determine the travel path candidate as the target travel path. In this case, a travel path candidate close to straight travel is generated with priority, and when the generated travel path candidate is generated within the travel area, the travel path candidate is determined as the target travel path. For this reason, the target travel path easily becomes a straight travel path, and an occupant of the vehicle is suppressed from feeling unsteadiness for vehicle travel.

In the travel control device, the path generation unit may determine that straightness is higher when the curvature of the travel path is smaller.

According to the invention, it is possible to perform the travel control of the vehicle while suppressing a sense of discomfort to an occupant of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described referring to the drawings. In the following description, the same or corresponding elements are represented by the same reference numerals, and overlapping description will be omitted.

Figure 1:
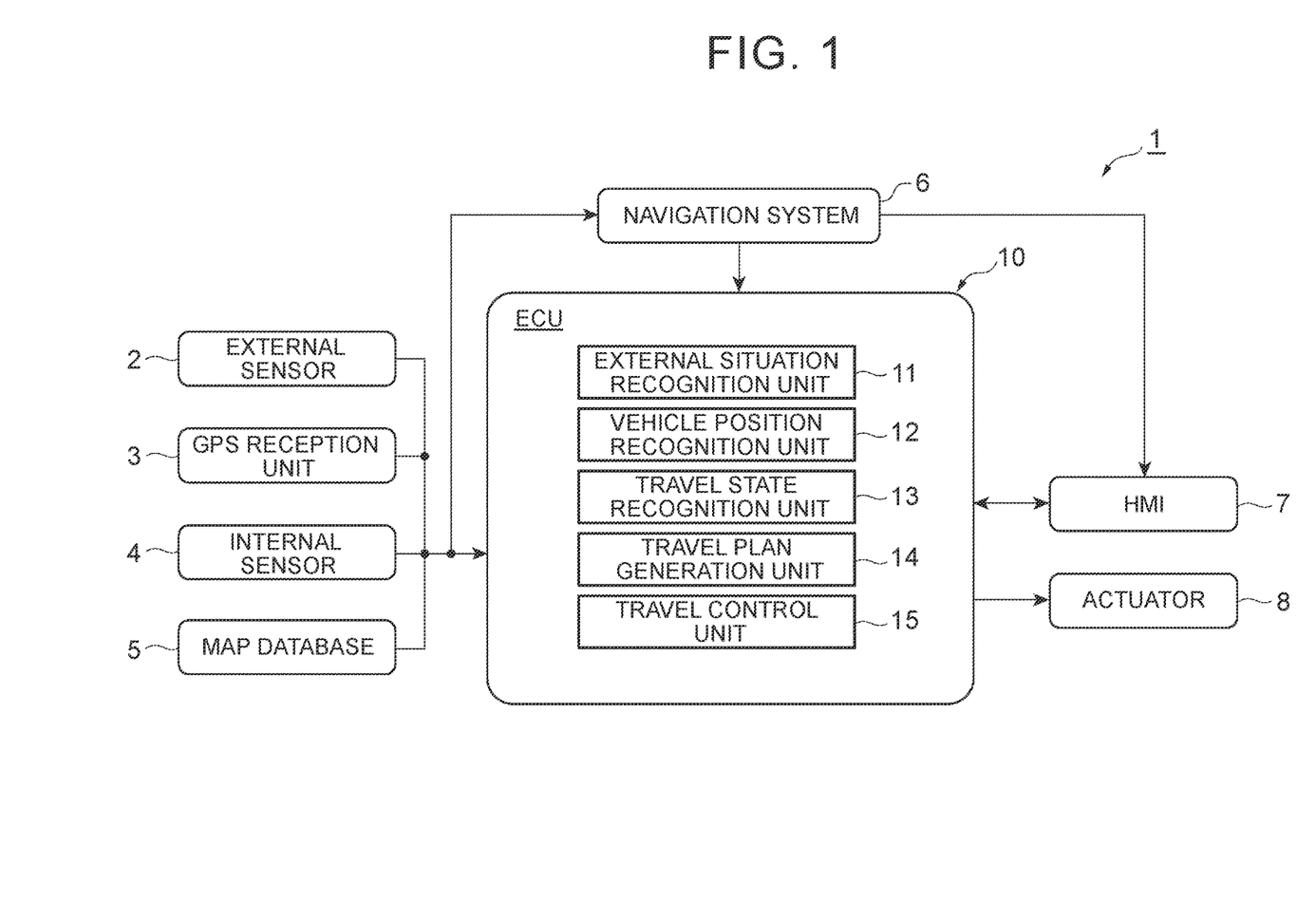
FIG. 1 is a schematic configuration diagram of a travel control device according to an embodiment of the invention.

FIG. 1 is a schematic configuration diagram of a travel control device 1 according to an embodiment of the invention. In FIG. 1, the travel control device 1 of this embodiment is a device which is mounted in a vehicle and performs travel control of the vehicle, and is applied to, for example, lane trace control for performing autonomous steering along a lane. The travel control device 1 may be a device which performs autonomous driving control including lane trace control, and in this embodiment, a device which can perform autonomous driving control will be described as an example.

The travel control device 1 may be applied to a vehicle in which driving support control can be performed, and may perform control intervention under predetermined conditions at the time of manual driving to execute travel control or may provide a generated target travel path to a driver to perform driving support. The travel control device 1 may also be applied to a device which autonomously executes travel control through advanced driving support control.

The travel control device 1 includes an electronic control unit (ECU) 10. The ECU 10 is an electronic control unit which performs travel control of the vehicle, and is primarily constituted of a computer including a central processing unit (CPU), a read only memory (ROM), and a random access memory (RAM). The details of the ECU 10 will be described below.

An external sensor 2, a global positioning system (GPS) reception unit 3, an internal sensor 4, a map database 5, a navigation system 6, a human machine interface (HMI) 7, and an actuator 8 are connected to the ECU 10.

The external sensor 2 is a detection device which detects an external situation as peripheral information of the vehicle. The external sensor 2 includes at least one of a camera, a radar, and a laser imaging detection and ranging (LIDER). The camera is an imaging device which images the external situation of the vehicle.

The camera of the external sensor 2 functions as a detection unit which detects lane markers provided on the right and left of a lane, along which the vehicle travels, and transmits imaging information obtained by imaging the lane markers to the ECU 10. The lane markers are, for example, lane division lines which are provided on the right and left of a road surface of a lane, and may be white lines, yellow lines, or lines of other colors. The lane markers may be solid lines or broken lines, or may be single lines or compound lines.

The camera is provided, for example, on the rear side of the front glass of the vehicle. The camera may be a monocular camera or may be a stereo camera. The stereo camera has two imaging units arranged so as to reproduce binocular parallax. Imaging information of the stereo camera includes information in a depth direction. When the stereo camera is used, the camera functions as an object detection unit which detects objects including preceding vehicles or obstacles.

The radar detects obstacles outside the vehicle using an electric wave (for example, millimeter wave). The radar transmits an electric wave to the periphery of the vehicle and receives an electric wave reflected by an obstacle to detect the obstacle. The radar transmits the detected obstacle information to the ECU 10. When sensor fusion is performed at a subsequent stage, it is desirable to transmit reception information of the electric wave to the ECU 10.

The LIDER detects obstacles outside the vehicle using light. The LIDER transmits light to the periphery of the vehicle and receives light reflected by an obstacle to measure the distance to the reflection point and to detect the obstacle. The LIDER transmits the detected obstacle information to the ECU 10. When sensor fusion is performed at a subsequent stage, it is desirable to transmit reception information of reflected light to the ECU 10. The camera, the radar, and the LIDER are not necessarily provided redundantly.

The GPS reception unit 3 receives signals from three or more GPS satellites to measure the position of the vehicle (for example, the latitude and longitude of the vehicle). The GPS reception unit 3 transmits the measured positional information of the vehicle to the ECU 10. Instead of the GPS reception unit 3, other means capable of specifying the latitude and longitude of the vehicle may be used. It is desirable that a function of measuring the direction of the vehicle is provided for comparison of a measurement result of a sensor and map information described below.

The internal sensor 4 is a detection device which detects the travel state of the vehicle. The internal sensor 4 includes at least one of a vehicle speed sensor, an acceleration sensor, and a yaw rate sensor. The vehicle speed sensor is a detector which detects the speed of the vehicle. As the vehicle speed sensor, for example, a wheel speed sensor which is provided in a wheel of the vehicle or a member, such as a drive shaft rotating integrally or synchronously with the wheel and detects the rotation speed of the wheel is used. The vehicle speed sensor outputs the detected vehicle speed information (wheel speed information) to the ECU 10.

The acceleration sensor is a detector which detects the acceleration of the vehicle. The acceleration sensor includes, for example, a longitudinal acceleration sensor which detects the longitudinal acceleration of the vehicle, and a lateral acceleration sensor which detects the lateral acceleration of the vehicle. The acceleration sensor transmits, for example, acceleration information of the vehicle to the ECU 10. The yaw rate sensor is a detector which detects a yaw rate (rotation angular velocity) around a vertical axis of the center of gravity of the vehicle. As the yaw rate sensor, for example, a gyro sensor can be used. The yaw rate sensor transmits the detected yaw rate information of the vehicle to the ECU 10.

The map database 5 is a database which includes map information. The map database is formed in, for example, a hard disk drive (HDD) mounted in the vehicle. The map information includes, for example, positional information of roads, information of road shapes (for example, classifications of curves and straight portions, curvatures of curves, and the like), and positional information of intersections and junctions. In order to use positional information of shield structures, such as buildings or walls, or a simultaneous localization and mapping (SLAM) technique, an output signal of the external sensor 2 is preferably included in the map information. The map database may be stored in a computer of a facility, such as an information processing center communicable with the vehicle.

The navigation system 6 is a device which performs guidance to a destination set by the driver of the vehicle for the driver of the vehicle. The navigation system 6 calculates a travel route of the vehicle based on the positional information of the vehicle measured by the GPS reception unit 3 and the map information of the map database 5. The route may be, for example, a route where a suitable lane is specified in a multi-lane section. The navigation system 6 calculates, for example, a target route from the position of the vehicle to the destination, and notifies the driver of the target route by the display on a display and speech output from a speaker. The navigation system 6 transmits, for example, information of the target route of the vehicle to the ECU 10. The navigation system 6 may be stored in a computer of a facility, such as an information processing center communicable with the vehicle.

The HMI 7 is an interface for output and input of information between an occupant (including the driver) of the vehicle and the travel control device 1. The HMI 7 includes, for example, a display panel for displaying image information to the occupant, a speaker for speech output, and operation buttons or a touch panel for an input operation of the occupant. For example, the HMI 7 outputs a signal to the ECU 10 to start or stop autonomous driving control or travel control if an input operation to operate or stop autonomous driving control or travel control is performed by the occupant. When the vehicle arrives at the destination where autonomous driving control or travel control ends, the HMI 7 notifies the occupant of arrival at the destination. The HMI 7 may output information to the occupant using a portable information terminal connected in a wireless manner or may receive an input operation of the occupant using the portable information terminal.

The actuator 8 is a device which executes autonomous driving control including travel control of the vehicle. The actuator 8 includes at least a throttle actuator, a brake actuator, and a steering actuator. The throttle actuator controls the supply amount (throttle opening) of air to an engine according to a control signal from the ECU 10 and controls a drive force of the vehicle. When the vehicle is a hybrid vehicle or an electric vehicle, the throttle actuator is not included, and a control signal from the ECU 10 is input to a motor as a power source and the drive force is controlled.

The brake actuator controls a brake system according to a control signal from the ECU 10 and controls a drive force provided to the wheel of the vehicle. As the brake system, for example, a hydraulic brake system can be used. The steering actuator controls the driving of an assist motor controlling steering torque in an electric power steering system according to a control signal from the ECU 10. With this, the steering actuator controls steering torque of the vehicle.

The ECU 10 includes an external situation recognition unit 11, a vehicle position recognition unit 12, a travel state recognition unit 13, a travel plan generation unit 14, and a travel control unit 15.

The external situation recognition unit 11 recognizes the external situation of the vehicle based on the detection result (for example, the imaging information of the camera, the obstacle information of the radar, the obstacle information of the LIDER, or the like) of the external sensor 2. The external situation includes, for example, the position of a lane marker, such as a white line, or the position of the lane center of a travel lane of the vehicle, a road width, and a road shape (for example, a curvature of a travel lane, a change in gradient of a road surface effective for prospective estimation of the external sensor 2, undulation, or the like), and a situation of an obstacle in the periphery of the vehicle (for example, information for distinguishing between a fixed obstacle and a moving obstacle, the position of an obstacle with respect to the vehicle V, a moving direction of an obstacle with respect to the vehicle, a relative speed of an obstacle with respect to the vehicle, or the like). The detection result of the external sensor 2 may be compared with the map information, thereby compensating for accuracy of the position and direction of the vehicle acquired by the GPS reception unit 3 or the like.

The vehicle position recognition unit 12 recognizes the position of the vehicle (hereinafter, referred to as "vehicle position") on the map based on the positional information of the vehicle received by the GPS reception unit 3 and the map information of the map database 5. The vehicle position recognition unit 12 may acquire and recognize the vehicle position used in the navigation system 6 from the navigation system 6. When the vehicle position of the vehicle can be measured by a sensor provided on the outside, such as on a road, the vehicle position recognition unit 12 may acquire the vehicle position from the sensor by communication.

The travel state recognition unit 13 recognizes the travel state of the vehicle based on the detection result (for example, the vehicle speed information of the vehicle speed sensor, the acceleration information of the acceleration sensor, the yaw rate information of the yaw rate sensor, and the like) of the internal sensor 4. The travel state of the vehicle includes, for example, a vehicle speed, an acceleration, or a yaw rate. The travel state recognition unit 13 recognizes the travel direction of the vehicle based on a temporal change in the position of the vehicle.

The travel plan generation unit 14 generates a target travel path of the vehicle based on, for example, the target route calculated by the navigation system 6, the vehicle position recognized by the vehicle position recognition unit 12, and the external situation (including the vehicle position and the direction) of the vehicle recognized by the external situation recognition unit 11.

The travel plan generation unit 14 functions as a travel area setting unit which sets a travel area of the vehicle between lane markers provided on the right and left of a lane in front of the vehicle. The travel plan generation unit 14 functions as a path generation unit which generates a target travel path of the vehicle within the set travel area.

In this case, the travel plan generation unit 14 selects a travel path candidate having high straightness among a plurality of travel path candidates with priority and determines the selected travel path candidate as the target travel path. For example, a travel path candidate having high straightness is generated with priority, and when the generated travel path candidate is generated within the travel area, the travel path candidate is determined as the target travel path. At this time, when the vehicle is turning, a returning path may be generated as a travel path candidate with priority over a steering maintaining path and an additional turning path, and when the generated travel path candidate is generated within the travel area, the travel path candidate may be determined as the target travel path.

High straightness means that travel of the vehicle is almost straight travel. For example, a path having a small curvature or a path to which a path portion having a small curvature is connected is a path having high straightness. Specifically, when there are a path candidate of straight travel and a path candidate having a curvature, the travel plan generation unit 14 selects a straight travel path as a travel path candidate and when the straight travel path is generated within the travel area, determines the straight travel path as the target travel path. When there are a plurality of path candidates having different curvatures as a travel path candidate, the travel plan generation unit 14 selects a path candidate in order from a path candidate having a smaller curvature, and when the path candidate is generated within the travel area, determines the path candidate as the target travel path. When there are a path candidate of returning of steering, a path candidate of maintaining of steering, and a path candidate of additional turning of steering as a travel path candidate, the returning path close to straight travel is selected and becomes a target travel path. Any selection method may be used as long as a travel path candidate having high straightness is determined as a target travel path with priority, and a target travel path may be determined by a method other than the above-described selection methods.

A target travel path is a locus where the vehicle travels in the target route. The travel plan generation unit 14 generates a path such that the vehicle suitably travels on the target route in light of references, such as safety, compliance, and travel efficiency. At this time, there is no doubt that the travel plan generation unit 14 generates a path of the vehicle so as to avoid contact with obstacles based on the situation of obstacles in the periphery of the vehicle.

The target route used herein includes a travel route which is automatically generated based on the external situation or the map information when the setting of the destination is not performed explicitly by the driver, like a following travel route in "DRIVING SUPPORT DEVICE" described in Japanese Patent No. 5382218 (WO2011/158347) or "AUTONOMOUS DRIVING DEVICE" described in Japanese Patent Application Publication No. 2011-162132.

The generation of the target travel path in the travel plan generation unit 14 is performed by, for example, the setting of the travel area, the calculation of the travel path candidate, and the determination of the target travel path.

The setting of the travel area is performed by setting the travel area between the lane markers in front of the vehicle. The positions of the lane markers are set using information recognized by the external situation recognition unit 11.

Figure 2:
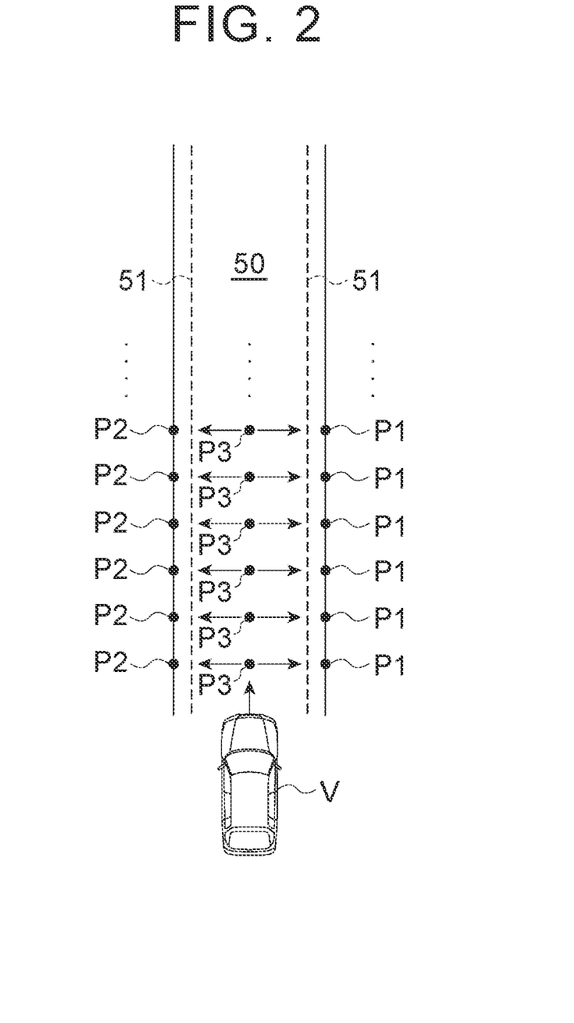
FIG. 2 is an explanatory view of setting of a travel area in the travel control device of FIG. 1.

As shown in FIG. 2, for example, in regard to the setting of the travel area, a center position P3 of a lane is calculated based on a position P1 of a right lane marker and a position P2 of a left lane marker. Then, a plurality of center positions P3 are calculated at a predetermined interval along a travel path. Boundaries 51, 51 of an area are set at positions extended at a predetermined distance from the center positions P3 toward the right and left lane markers, and the area between the boundaries 51, 51 is set as a travel area 50. In the setting of the travel area, boundaries 51, 51 may be set at positions narrowed at a predetermined distance from the positions P1, P2 of the right and left lane markers toward the lane center. The travel area 50 may be set in a distance range set in advance from the vehicle V in the travel direction.

The target travel path of the vehicle V is generated within the travel area 50. The target travel path of the vehicle V may be within the travel area 50, and since the setting of the travel path is not limited to the center position of the lane, even if an error occurs in the position detection of the lane markers, or the shape of the travel path or the lane is distorted, the occurrence of distortion in the target travel path due to the error in the position detection or distortion of the shape of the travel path or the lane is suppressed, and travel control which becomes steep steering is suppressed.

In regard to the calculation of the travel path candidate, calculation processing is performed such that a plurality of travel path candidates having different curvatures are generated. In this case, a travel path candidate having high straightness among a plurality of travel path candidates is calculated with priority.

Figure 3:
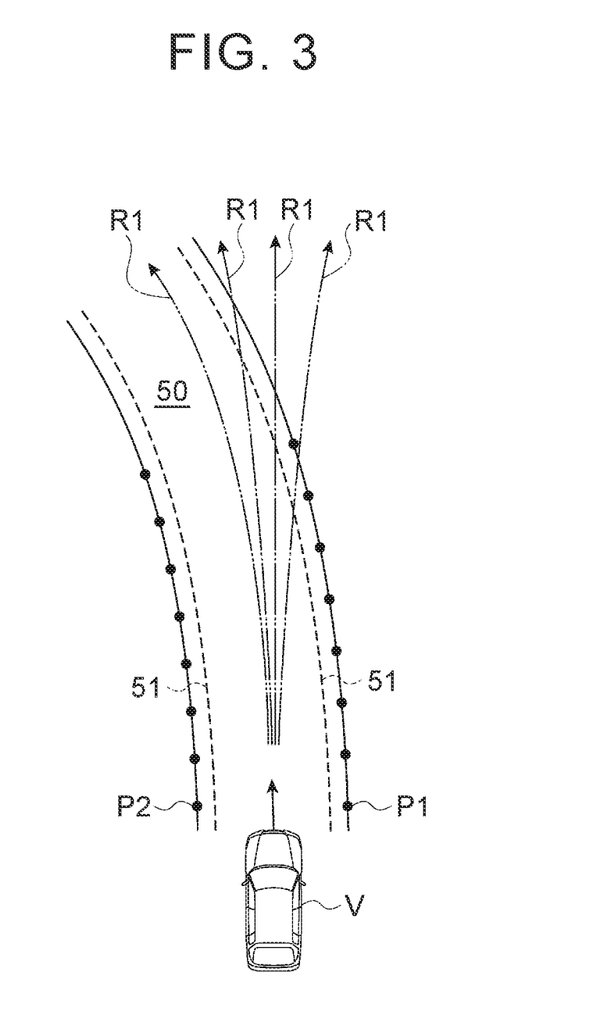
FIG. 3 is an explanatory view of calculation of a travel path candidate in the travel control device of FIG. 1.

As shown in FIG. 3, as the travel path candidates having different curvatures, a travel path candidate R1 for straight travel and a travel path candidate R1 for turning are calculated. In this case, the travel path candidate R1 for straight travel is calculated with priority over the travel path candidate R1 for turning. In regard to the travel path candidate R1 for turning, a plurality of travel path candidates R1 are calculated while changing a steering angle by a predetermined angle. Although FIG. 3 shows four travel path candidates R1 for convenience of description, more or less travel path candidates R1 may be calculated. The travel path candidate R1 may be a path where a steering angle is constant or may be a path where a steering angle is returned or a path where a steering angle is turned. As the travel path candidate R1, a path extended from the vehicle V to the distance range set in advance in the travel direction may be calculated.

The travel path candidate R1 is calculated, for example, using Expression (1) described below.

$$\mathrm{curv}(x) = (1-k) \cdot C_0 \cdot \exp(-\lambda \cdot x) + k \cdot C_0 \cdot \exp(\lambda \cdot x) \qquad (1)$$

In Expression (1), x is the position in the vehicle travel direction or the distance from the vehicle. $C_0$ is a reciprocal of a current turning radius of the vehicle, that is, a curvature. curv(x) represents a curvature at the position x, and consequently represents the path shape of the travel path candidate R1. Expression (1) is derived by a variational method as a curvature which minimizes a value derived by substituting a value obtained by weighting and adding an integrated value of a square of a curvature of a path and an integrated value of a square of differential into the Euler equation and solving a thus-obtained differential equation. Here, $\lambda$ represents the ratio of the weights of the integrated value of the square of the curvature and the integrated value of the square of the differential. The weight of the integrated value of the square of the curvature when $\lambda$ is 0 becomes 0. k is an integration constant.

In Expression (1), calculation is performed while changing k and $\lambda$, whereby a plurality of travel path candidates R1 can be calculated. For example, in Expression (1), when k is set to 0, curv(x) represents a curve where a curvature is attenuated from $C_0$ to 0, and a path to travel straight is calculated. At this time, when $\lambda$ is large, a path becomes close to straight travel quickly. That is, when k is 0, a path of returning of steering is obtained.

In Expression (1), when $\lambda$ is set to 0, curv(x) becomes $C_0$, and a path to maintain a current turning radius is calculated. That is, a steering maintaining path where steering is maintained is obtained. In Expression (1), when k>0, a path where curv(x) is further steered from $C_0$ in the same turning direction is calculated. That is, a path of additional turning of steering is obtained. In Expression (1), when k<0, a path where curv(x) is steered from $C_0$ in an opposite direction is calculated. That is, a path of an S-shaped curve is obtained.

As the determination of the target travel path, the travel path candidate R1 having high straightness among a plurality of travel path candidates R1 is selected with priority, and the selected travel path candidate is determined as the target travel path. For example, the travel path candidate R1 having high straightness is generated with priority, and the travel path candidate R1 generated within the travel area 50 is determined as the target travel path.

Figure 4:
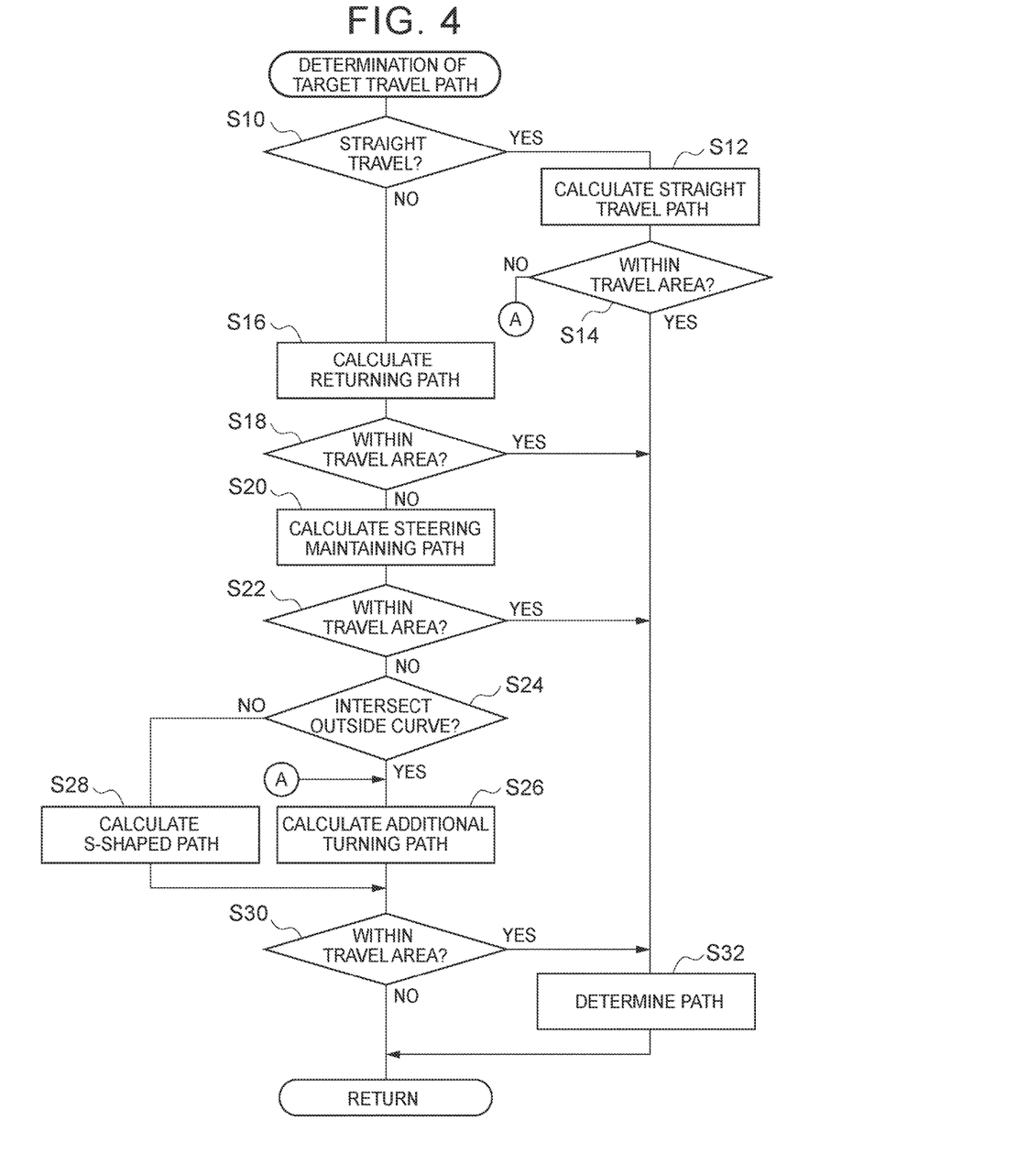
FIG. 4 is a flowchart showing determination processing of a target travel path in the travel control device of FIG. 1.

FIG. 4 is a flowchart showing an example of the calculation of the travel path candidate and the determination of the target travel path. The processing of the flowchart of FIG. 4 is processing in which travel path candidates are calculated in order of a returning path, a steering angle maintaining path, and an additional turning path or an S-shaped path, and a travel path candidate positioned within the travel area, that is, a travel path candidate not intersecting the boundary line of the travel path is determined as the target travel path of the vehicle. The returning path is a path where a steering wheel and steering are returned, the steering angle maintaining path is a path where a steering angle of the steering wheel and a steering state are maintained, the additional turning path is a path where the steering wheel and steering are turned, and the S-shaped path is a path where the steering wheel and steering are turned in the direction opposite to the current turning direction.

As shown in Step S10 (hereinafter, simply referred to as "S10". The same applies to other steps S.) of FIG. 4, it is determined whether or not the vehicle is traveling straight. In this determination processing, for example, it may be determined whether or not the vehicle is traveling straight based on information recognized by the travel state recognition unit 13. In S10, when it is determined that the vehicle is traveling straight, calculation processing of a straight travel path is performed (S12). The calculation processing of the straight travel path is processing for calculating a path for straight travel as a travel path candidate. For example, the calculation of the path is performed by substituting 0 into $C_0$ in Expression (1) described above. In this case, a path where curv(x) becomes 0 is calculated. The direction of the path is set according to the travel direction of the vehicle. The travel direction of the vehicle may be calculated, for example, from a temporal change in the vehicle position of the vehicle position recognition unit 12.

The process progresses to S14, and it is determined whether or not the travel path candidate of the straight travel path is generated within the travel path. That is, it is determined that the travel path candidate of the straight travel path does not intersect the boundary of the travel area. For example, in FIG. 3, the second travel path candidate R1 of the straight travel path from the left intersects the boundary 51 of the travel area 50. For this reason, it is determined that the travel path candidate R1 of the straight travel path is not generated within the travel area 50.

In S14, when it is determined that the travel path candidate of the straight travel path is generated within the travel path, the travel path candidate of the straight travel path is determined as a target travel path (S32). In S14, when it is determined that the travel path candidate of the straight travel path is not generated within the travel path, calculation processing of an additional turning path is not performed (S26). The details of the calculation processing of the additional turning path will be described below.

On the other hand, in S10, when it is determined that the vehicle is not traveling straight, calculation processing of a returning path is performed (S16). The calculation processing of the returning path is processing in which a path where the steering wheel and steering are returned is calculated as a travel path candidate. For example, in Expression (1) described above, a path is calculated while setting k to 0 and changing $\lambda$ in order from a small value. A plurality of values set in advance are used as $\lambda$ and substituted into Expression (1) sequentially from a small value, and the travel path candidate of the returning path is calculated.

The process progresses to S18, and it is determined whether or not the returning path is generated within the travel path. That is, it is determined whether or not the travel path candidate of the returning path intersects the boundary of the travel area. This determination is performed, for example, in order from the travel path candidate of the returning path having a small value of $\lambda$ among the travel path candidates of the returning paths calculated while gradually changing $\lambda$ from a minimum value to a large value in Expression (1). That is, it is determined whether or not a path is generated within the travel path in order from a path (a path where a lateral acceleration is low) with less turning change than the current turning state.

Figure 5:
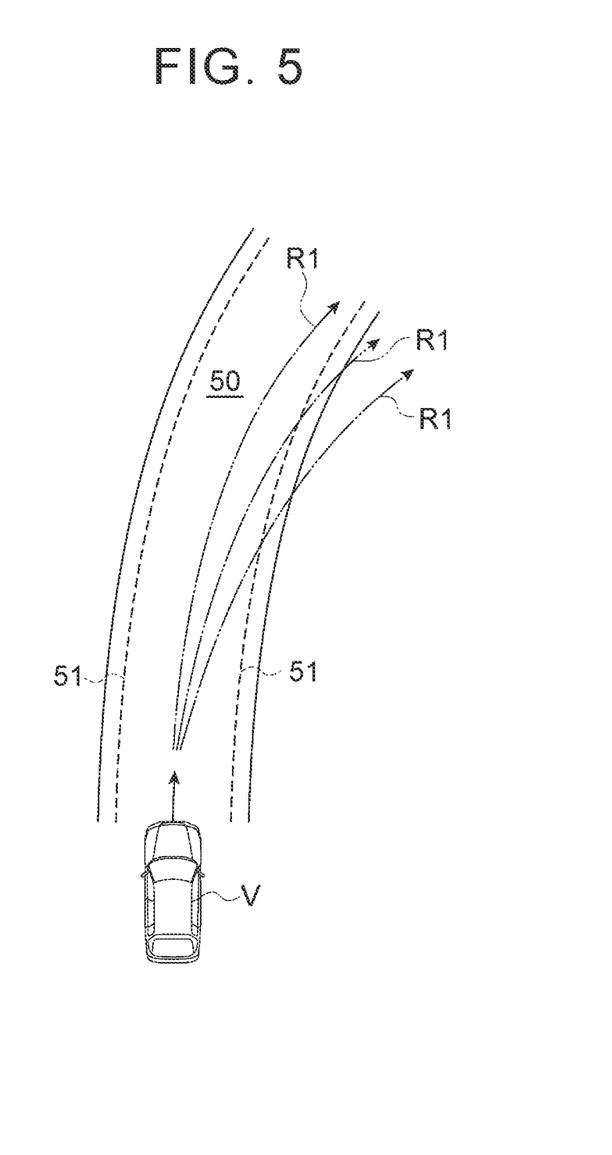
FIG. 5 is an explanatory view of calculation of a travel path candidate in the travel control device of FIG. 1.

Specifically, as shown in FIG. 5, the travel path candidate R1 of the returning path is calculated in order of right, center, and left, and it is determined whether or not the travel path candidate R1 intersects the boundary 51 of the travel area 50 in this order. In FIG. 5, the center travel path candidate R1 becomes a returning path earlier than the right travel path candidate R1, and the left travel path candidate R1 becomes a returning path earlier than the center travel path candidate R1. It is determined that the right and center travel path candidates R1 intersect the boundary 51 and are not generated within the travel area 50, and it is determined that the left travel path candidate R1 does not intersect the boundary 51 and is generated within the travel area 50.

In S18, when it is determined that either returning path is generated within the travel area, the returning path generated within the travel area is determined as the target travel path of the vehicle (S32). In S18, when it is determined that no returning paths are generated within the travel area, calculation processing of a steering maintaining path is performed (S20). The calculation processing of the steering maintaining path is processing in which a path where the vehicle travels while maintaining the steering angle is calculated as a travel path candidate. For example, in Expression (1) described above, a travel path candidate is calculated while setting $\lambda$ to 0.

The process progresses to S22, and it is determined whether or not the steering maintaining path is generated within the travel area. In S22, when it is determined that the steering maintaining path is generated within the travel area, the steering maintaining path generated within the travel area is determined as the target travel path of the vehicle (S32). In S22, when it is determined that the steering maintaining path is not generated within the travel area, it is determined whether or not the steering maintaining path intersects the boundary outside the curve of the travel area (S24). That is, it is determined whether or not the steering maintaining path becomes a path intersecting the boundary on the outer circumference of the travel area. In S24, when it is determined that the steering maintaining path intersects the boundary outside the curve of the travel area, calculation of an additional turning path is performed (S26). The calculation processing of the additional turning path is processing in which a path where the steering wheel and steering are turned is calculated as a travel path candidate. For example, a path is calculated while setting k>0 and changing $\lambda$ in order from a small value in Expression (1). A plurality of values set in advance are used as $\lambda$ and substituted into Expression (1) sequentially from a small value, and the travel path candidate of the additional turning path is calculated.

The process progresses to S30, and it is determined whether or not the additional turning path is generated within the travel area. That is, it is determined whether or not the additional turning path intersects the boundary of the travel area. This determination is performed in order from the travel path candidate of the returning path having a small value of $\lambda$ among the travel path candidates of the returning paths calculated, for example, gradually changing $\lambda$ from a minimum value to a large value in Expression (1).

In S30, when it is determined that either additional turning path is generated within the travel area, the additional turning path generated within the travel area is determined as the target travel path of the vehicle (S32). In S30, when it is determined that no additional turning paths are generated within the travel area, control processing ends.

On the other hand, in S24, when it is determined that the steering maintaining path intersects the boundary outside the curve of the travel area, calculation of an S-shaped path is performed (S28). The calculation processing of the S-shaped path is processing in which a path in an S shape is calculated as a travel path candidate. For example, a path is calculated while setting k<0 and changing λ in order from a small value in Expression (1). A plurality of values set in advance are used as λ and substituted into Expression (1) sequentially from a small value, and the travel path candidate of the S-shaped path is calculated.

The process progresses to S30, and it is determined whether or not the S-shaped path is generated within the travel area. That is, it is determined whether or not the S-shaped path intersects the boundary of the travel area. This determination is performed, for example, in order from the travel path candidate of the S-shaped path having a small value of λ among the travel path candidates of the S-shaped paths calculated while gradually changing λ from a minimum value to a large value in Expression (1).

In S30, when it is determined that either S-shaped path is generated within the travel area, the S-shaped path generated within the travel area is determined as the target travel path of the vehicle (S32). In S30, when it is determined that no S-shaped paths are generated within the travel area, control processing ends.

As described above, according to the travel path determination processing of FIG. 4, a travel path candidate having high straightness is generated with priority, and when the generated travel path candidate is generated within the travel area, the travel path candidate is determined as the target travel path. For this reason, the target travel path easily becomes a straight travel path, and an occupant of the vehicle is suppressed from feeling unsteadiness for vehicle travel. The lateral acceleration of the vehicle is reduced, and improvement of riding comfort of the vehicle is achieved.

When the vehicle is turning, the returning path is generated as the travel path candidate with priority, and when the generated travel path candidate is generated within the travel area, the travel path candidate is determined as the target travel path. For this reason, the target travel path easily becomes a path close to straight travel, and an occupant of the vehicle is suppressed from feeling unsteadiness for vehicle travel. The lateral acceleration of the vehicle is reduced, and improvement of riding comfort of the vehicle is achieved.

In the calculation of the travel path candidate of the travel plan generation unit 14 and the determination of the travel path, the travel path candidates within the travel area are calculated in order of the returning path, the steering angle maintaining path, and the additional turning path, or in order of the returning path, the steering angle maintaining path, and the S-shaped path. That is, a path for returning to straight travel is calculated with priority and selected as a target travel path. For this reason, a travel path for reducing a lateral acceleration of the vehicle is selected with priority, and improvement of riding comfort of the vehicle is achieved.

According to the travel path determination processing of FIG. 4, a travel path candidate with less steering change of the vehicle is calculated with priority and selected as a target travel path. For this reason, a path with less change in lateral acceleration is selected with priority. Therefore, improvement of riding comfort of the vehicle is achieved.

The calculation of the travel path candidate may be performed by calculation or methods other than the calculation based on Expression (1). For example, a travel path candidate may be calculated by a numerical expression mainly composed of Expression (1). That is, a travel path candidate may be calculated using an expression which is modified by applying coefficients, constants, or variables to Expression (1). A calculation expression other than Expression (1) may be used as long as travel path candidates, such as a returning path, a steering angle maintaining path, and an additional turning path, can be calculated, and travel path candidates may be calculated by other calculation methods. The travel path candidates may be generated assuming that the vehicle travels at a constant speed or may be generated in consideration of a change in speed of the vehicle.

In the travel path determination processing of FIG. 4, when a target travel path cannot be generated or determined, a target travel path previously calculated may be used. In this case, it is possible to suppress frequent stopping of travel control. When a target travel path cannot be generated or determined successively a predetermined number of times, a warning may be given to the driver of the vehicle to request switching to manual driving. In this case, it is possible to secure safety of travel of the vehicle.

In FIG. 1, the travel plan generation unit 14 generates a travel plan according to the generated path. That is, the travel plan generation unit 14 generates a travel plan along the target route set in advance based on at least the external situation as the peripheral information of the vehicle and the map information of the map database 5. The travel plan generation unit 14 preferably outputs the generated travel plan with a plurality of sets of two elements of a target position p in a coordinate system fixed to the vehicle and a speed v at each target point, that is, configuration coordinates (p,v) as a route of the vehicle. Each target position p has at least the positions of the x coordinate and the y coordinate in a coordinate system fixed to the vehicle V or equivalent information. The travel plan is not particularly limited as long as the behavior of the vehicle is described. The travel plan may use, for example, a target time t instead of the speed v, and the target time t and the direction of the vehicle at this time may be attached.

Normally, the travel plan is sufficient to have future data beyond several seconds from the current time; however, in a situation of a right turn at an intersection, passing of a vehicle, or the like, since data of tens of seconds is required, it is preferable that the number of configuration coordinates of the travel plan is variable and the distance between the configuration coordinates is variable. A curve connecting the configuration coordinates may be approximated by a spline function or the like, and the parameters of the curve may be a travel plan. In regard to the generation of the travel plan, an arbitrary known method can be used as long as the behavior of the vehicle can be described.

The travel plan may be data indicating the transition of the speed, the acceleration/deceleration, and steering torque of the vehicle when the vehicle travels a route along the target route. The travel plan may include a speed pattern, an acceleration/deceleration pattern, and a steering pattern of the vehicle. Here, the travel plan generation unit 14 may generate a travel plan such that a travel time (a required time until the vehicle V arrives at the destination) is minimized.

Incidentally, the speed pattern is, for example, data which is composed of a target vehicle speed set in association with the time at each target control position for the target control positions set at predetermined intervals (for example, 1 m) on the route. The acceleration/deceleration pattern is, for example, data which is composed of a target acceleration/deceleration set in association with the time at each target control position for the target control positions set at predetermined intervals (for example, 1 m) on the route. The steering pattern is, for example, data which is composed of target steering torque set in association with the time at each target control position for the target control positions set at predetermined intervals (for example, 1 m) on the route.

The travel control unit 15 automatically controls the travel of the vehicle based on the travel plan generated by the travel plan generation unit 14. The travel control unit 15 outputs a control signal according to the travel plan to the actuator 8. With this, the travel control unit 15 controls the travel of the vehicle such that the vehicle autonomously travels along the travel plan.

The external situation recognition unit 11, the vehicle position recognition unit 12, the travel state recognition unit 13, the travel plan generation unit 14, and the travel control unit 15 described above may be constituted by introducing software or programs for realizing the respective functions into the ECU 10. A part or all of the units may be constituted of individual electronic control units.

Next, the operation of the travel control device 1 of this embodiment will be described.

Figure 6:
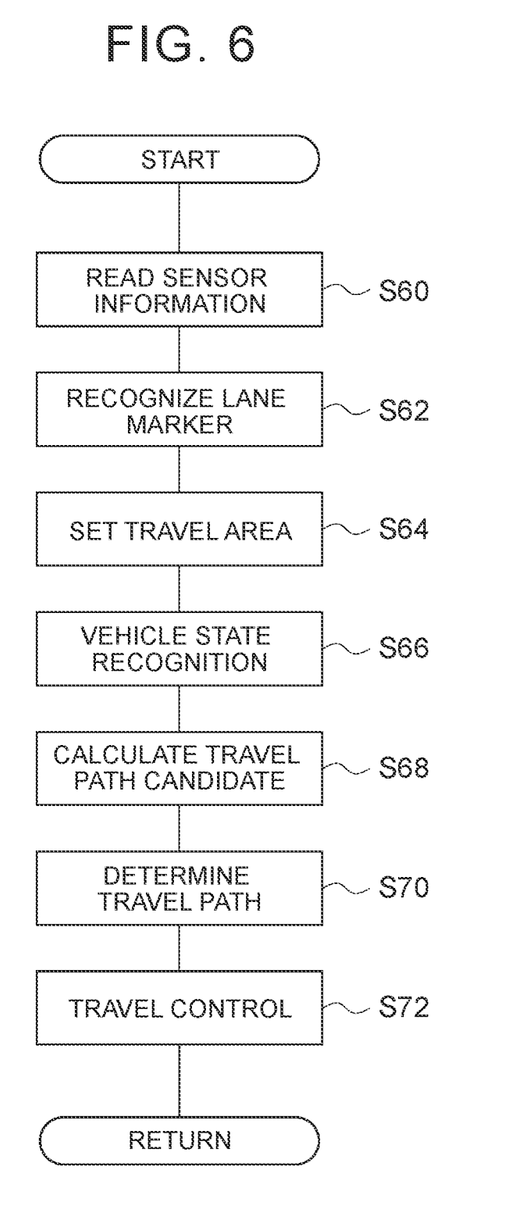
FIG. 6 is a flowchart showing travel control processing in the travel control device of FIG. 1.

FIG. 6 is a flowchart showing travel control processing in the travel control device 1 of this embodiment. The travel control processing is performed, for example, when autonomous travel control is being executed, and is started along with the start of the autonomous travel control. The travel control processing is performed by, for example, the ECU 10 and repeatedly executed in a predetermined cycle.

As shown in S60 of FIG. 6, first, reading processing of sensor information is performed. This processing is processing for reading information of the external sensor 2, the GPS reception unit 3, the internal sensor 4, and the navigation system 6. The process progresses to S62, and recognition processing of lane markers is performed. The recognition processing of the lane markers is processing for recognizing the relative positions of the lane marker, such as white lines, provided on the right and left of the lane along which the vehicle travels. With the recognition of the lane markers, it is possible to recognize the position of the lane where the vehicle is traveling. The travel direction of the vehicle with respect to the lane may be recognized.

The process progresses to S64, and setting processing of a travel area is performed. The setting processing of the travel area is processing for setting a travel area between the lane markers in front of the vehicle. For example, as shown in FIG. 2, the center position P3 of the lane is calculated based on the position P1 of the right lane marker and the position P2 of the left lane marker. A plurality of center positions P3 are calculated at a predetermined interval along the travel path. The boundaries 51, 51 are set at the positions extended at a predetermined distance from the center positions P3 toward the right and left lane markers, and the area between the boundaries 51, 51 is set as the travel area 50. In the setting processing of the travel area, the boundaries 51, 51 may be set at the positions narrowed at a predetermined distance from the positions P1, P2 of the right and left lane markers toward the lane center. The travel area 50 may be set in the distance range set in advance from the vehicle V in the travel direction.

Figure 7:
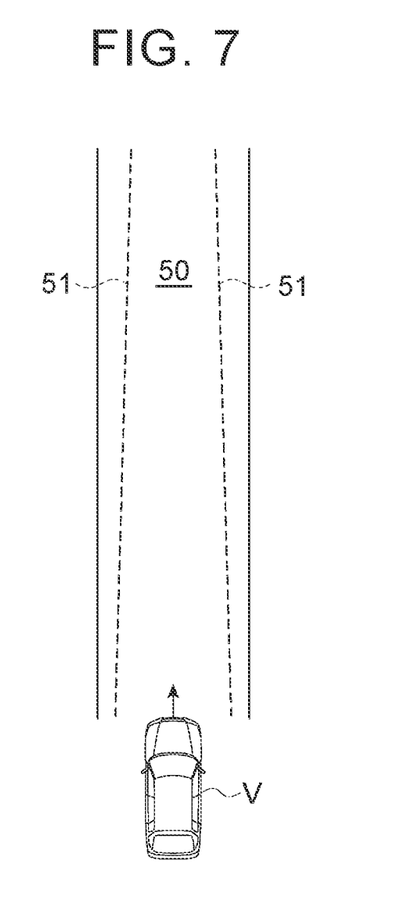
FIG. 7 is an explanatory view of a modification example of setting of a travel area in the travel control device of FIG. 1.

In the setting of the travel area 50, the lateral width of the travel area 50 may be set to be narrower with increasing distance from the vehicle. For example, as shown in FIG. 7, the lateral width of the travel area 50 may be narrowed with increasing distance from the vehicle V. In regard to a way of narrowing the travel area 50, the travel area 50 may be narrowed in reverse proportion to the distance from the vehicle V, or may be narrowed in a stepwise manner at each predetermined distance. In this case, the center position of the travel area 50 may be set as the center position of the lane. The center position of the lane includes the position around the center. As a way of narrowing the travel area 50, the lateral width of the vehicle V may be virtually set to be larger at a remote position, and the travel area 50 may be set such that the vehicle V does not intersect the boundary 51.

In this way, the lateral width of the travel area is set to be narrower with increasing distance from the vehicle to make the target travel path generated within the travel area be a path toward the center of the lane.

On the other hand, after the setting processing of the travel area of S64 of FIG. 6 ends, the process progresses to S66, and vehicle state recognition processing is performed. The vehicle state recognition processing is processing for recognizing at least the vehicle position, the direction of the vehicle with respect to the lane, and the turning state of the vehicle. This processing is performed by recognizing the vehicle position, the direction of the vehicle with respect to the lane, and the turning state of the vehicle, for example, based on information of the external sensor 2, the GPS reception unit 3, and the internal sensor 4.

After the vehicle state recognition processing of S66 ends, the calculation processing of the travel path candidate and the determination processing of the target travel path is performed (S68, S70). The calculation processing of the travel path candidate is processing in which travel path candidates as a candidate of a target travel path are calculated. The determination processing of the target travel path is processing in which the target travel path is selected and determined from the travel path candidates.

The calculation processing of the travel path candidate is performed by calculating a plurality of travel path candidates having different curvatures, for example, using Expression (1) described above. At this time, a travel path candidate having high straightness among a plurality of travel path candidates is generated with priority. For example, a straight travel path is generated with priority over a turning path. In the turning path, travel path candidates are generated in order of a returning path, a steering maintaining path, and an additional turning path. The determination processing of the target travel path is performed by determining a candidate generated within the travel area among the travel path candidates calculated by the calculation processing of the travel path candidate as a target travel path. The calculation processing of the travel path candidate and the determination processing of the target travel path can use a series of control processing of FIG. 4 described above.

The process progresses to S72 of FIG. 6, and travel control processing is performed. The travel control processing is processing in which travel control is performed on the vehicle according to the target travel path. A control signal is output from the ECU 10 to the actuator 8 such that the vehicle travels along the target travel path, and control of the vehicle is performed with the operation of the actuator 8. After the travel control processing of S72 ends, a series of control processing ends.

In the travel control processing of FIG. 6, the execution of a part of the control processing may be omitted as long as the control result is not affected, and the order of the control processing may be changed or other control processing may be added.

As described above, according to the travel control device 1 of this embodiment, the travel area of the vehicle is set between the lane markers of the lane, and the target travel path of the vehicle is generated within the travel area. For this reason, even if an error occurs in the detection of the lane markers, the influence on the target travel path is suppressed. When generating the target travel path of the vehicle within the travel area, the travel path candidate having high straightness is selected with priority and determined as the target travel path. For this reason, the target travel path easily becomes a straight travel path, and an occupant of the vehicle is suppressed from feeling unsteadiness for vehicle travel. Since the target travel path easily becomes the straight travel path, reduction in lateral acceleration applied to the vehicle is achieved, and improvement of riding comfort of the vehicle is achieved.

According to the travel control device 1 of this embodiment, a travel path candidate having high straightness is generated with priority, and when the generated travel path candidate is generated within the travel area, the travel path candidate is determined as the target travel path. For this reason, the target travel path easily becomes a straight travel path, and an occupant of the vehicle is suppressed from feeling unsteadiness for vehicle travel.

According to the travel control device 1 of this embodiment, when the vehicle is turning, the returning path is generated as the travel path candidate with priority, and when the generated travel path candidate is generated within the travel area, the travel path candidate is determined as the target travel path. For this reason, the target travel path easily becomes a path close to straight travel, and an occupant of the vehicle is suppressed from feeling unsteadiness for vehicle travel.

According to the travel control device 1 of this embodiment, the lateral width of the travel area is set to be narrower with increasing distance from the vehicle while taking the center position of the travel area as the center position of the lane. For this reason, the target travel path is generated within the travel area to make the target travel path be a path toward the center of the lane.

Although the above-described embodiment illustrates an embodiment of the travel control device according to the invention, the travel control device according to the invention is not limited to that described in the above-described embodiment. The travel control device according to the invention may be applied to an altered or alternative travel control device as long as the matter described in the claims is not modified.

What is claimed is:

1. A travel control device which allows a vehicle to travel along a lane of a travel path, the travel control device comprising:
    a detection unit which detects lane markers provided on the right and left of the lane;
    a travel area setting unit which sets a travel area of the vehicle between the lane markers in front of the vehicle;
    a path generation unit which generates a target travel path of the vehicle within the travel area set; and
    a travel control unit which controls the vehicle to travel along the target travel path,
    wherein the path generation unit selects a travel path candidate having high straightness among a plurality of travel path candidates with priority and determines the selected travel path candidate as the target travel path,
    wherein, when the vehicle is turning, the path generation unit generates a returning path, which is a path where a steering wheel and a steering are returned, as a travel path candidate with priority over a steering angle maintaining path, which is a path where a steering angle of the steering wheel and a steering state are maintained, and an additional turning path, which is a path where the steering wheel and steering are turned, and
    when the generated travel path candidate is generated within the travel area, the travel path candidate is determined as the target travel path.

2. The travel control device according to claim 1, wherein the travel area setting unit sets a lateral width of the travel area to be narrower with increasing distance from the vehicle while taking a center position of the travel area as a center position of the lane.

3. The travel control device according to claim 1, wherein the path generation unit generates a travel path candidate having high straightness with priority, and when the generated travel path candidate is generated within the travel area, determines the travel path candidate as the target travel path.

4. The travel control device according to claim 1, wherein the path generation unit determines that straightness is higher when the curvature of the travel path is smaller.

5. A travel control device which allows a vehicle to travel along a lane of a travel path, the travel control device comprising:
    a sensor configured to detect lane markers provided on a right side of the lane and a left side of the lane; and
    an ECU configured to:
    set a travel area of the vehicle between the lane markers in front of the vehicle;
    generate a target travel path of the vehicle within the set travel area;
    set a travel path candidate having a high straightness among a plurality of travel path candidates with priority;
    determine the selected travel path candidate as the target travel path; and
    control the travel along the target travel path,
    wherein, when the vehicle is turning, the path generation unit generates a returning path, which is a path where a steering wheel and a steering are returned, as a travel path candidate with priority over a steering angle maintaining path, which is a path where a steering angle of the steering wheel and a steering state are maintained, and an additional turning path, which is a path where the steering wheel and steering are turned, and
    when the generated travel path candidate is generated within the travel area, the travel path candidate is determined as the target travel path.

* * * * *